United States Patent
Parr et al.

[11] Patent Number: 5,930,936
[45] Date of Patent: Aug. 3, 1999

[54] WILDFOWL DECOY

[75] Inventors: John P. Parr, Overland Park; James W. McBee, Shawnee; William D. Goodson, Lenexa; Everett R. Bretches, II, Overland Park, all of Kans.

[73] Assignee: Splash Decoys LLC, Lenexa, Kans.

[21] Appl. No.: 08/917,437

[22] Filed: Aug. 19, 1997

[51] Int. Cl.⁶ .................................................. A01M 31/06
[52] U.S. Cl. ............................................................ 43/3
[58] Field of Search ................... 43/2, 3, 26.1; 446/154, 446/156, 157, 158, 163

[56] References Cited

U.S. PATENT DOCUMENTS

| | | | |
|---|---|---|---|
| 636,106 | 10/1899 | Biddle | 446/159 |
| 1,828,034 | 10/1931 | Einfalt | 446/159 |
| 2,051,221 | 8/1936 | Noddings | 446/159 |
| 2,229,175 | 1/1941 | Johnson | 446/159 |
| 2,434,335 | 1/1948 | Signalness | 43/3 |
| 2,439,710 | 4/1948 | Banigan | 43/3 |
| 2,443,040 | 6/1948 | Jones | 43/2 |
| 2,457,295 | 12/1948 | Woodhead | 43/3 |
| 2,460,128 | 1/1949 | Greenleaf | 43/3 |
| 2,480,390 | 8/1949 | Thompson | 43/3 |
| 2,591,554 | 4/1952 | Kinney et al. | 43/3 |
| 2,691,233 | 10/1954 | Richardson | 446/159 |
| 2,704,416 | 3/1955 | Laird | 446/159 |
| 2,754,609 | 7/1956 | Schultz | 43/17 |
| 2,793,456 | 5/1957 | Argo | 43/3 |
| 2,814,898 | 12/1957 | Fluke et al. | 43/3 |
| 2,849,823 | 9/1958 | Miller | 43/3 |
| 2,903,812 | 9/1959 | Lewis | 43/3 |
| 3,000,128 | 9/1961 | McAda | 43/3 |
| 3,047,972 | 8/1962 | Taylor | 43/3 |
| 3,115,721 | 12/1963 | Story | 43/3 |
| 3,628,286 | 12/1971 | Mashahiro | 446/159 |
| 3,689,927 | 9/1972 | Boston | 343/225 |
| 3,704,538 | 12/1972 | Gagnon | 43/3 |
| 3,927,485 | 12/1975 | Thorsnes, Jr. | 43/3 |
| 3,939,591 | 2/1976 | Schwartztrauber | 43/3 |
| 4,073,397 | 2/1978 | Snodgrass | 215/1 |
| 4,322,908 | 4/1982 | McCrory | 43/3 |
| 4,435,913 | 3/1984 | Messina | 43/3 |
| 4,566,124 | 1/1986 | McCrory et al. | 43/3 |
| 4,612,722 | 9/1986 | Ferrell | 43/3 |
| 4,620,385 | 11/1986 | Carranza et al. | 43/3 |
| 4,651,458 | 3/1987 | Lanius | 43/3 |
| 4,674,219 | 6/1987 | Chargo et al. | 43/3 |
| 4,753,028 | 6/1988 | Farmer | 43/3 |
| 5,145,442 | 9/1992 | Zan | 446/163 |
| 5,377,439 | 1/1995 | Roos et al. | 43/3 |

FOREIGN PATENT DOCUMENTS

| | | | |
|---|---|---|---|
| 8865 | 4/1902 | United Kingdom | 43/3 |
| 625497 | 6/1949 | United Kingdom | 43/3 |
| 2131266 | 6/1984 | United Kingdom | 43/2 |

*Primary Examiner*—Michael J. Carone
*Assistant Examiner*—Fredrick T. French, III
*Attorney, Agent, or Firm*—Shook, Hardy & Bacon LLP

[57] ABSTRACT

A decoy, for simulating a wildfowl in feeding position, has a body within a keel located beneath the body. The body houses a motor and motor controller, for intermittently rotating an axle with outer ends, located outside the body, having paddle members thereon. Rotation of the axle, and thus the paddle members, causes the water in which the decoy is deployed to splash. The motor controller permits operator selectable durations of energization time and idle time for rotation of the paddle members. A sliding weight in the keel permits adjustment of pitch of the decoy. A counterweight permits balance adjustment, thereby permitting operation of the decoy to include a roll, or rotation about a vertical axis. The decoy also has a unique fitting for attachment of an anchor.

19 Claims, 2 Drawing Sheets

WILDFOWL DECOY

BACKGROUND OF THE INVENTION

1. Field of the Invention

The present invention is generally directed to a decoy for luring wildfowl for hunting purposes. More specifically, the present invention is directed to a decoy in a feeder position.

2. Description of the Related Art

Decoys are commonly employed by hunters to attract game birds such as geese and duck. In order to adequately serve their intended purpose, it is highly desirable that a decoy accurately simulate a goose, duck, or wildfowl to be attracted. In order to make decoys more lifelike, numerous attempts have been made to automate a decoy or provide moving parts to simulate a moving wildfowl.

For instance, U.S. Pat. No. 2,460,128 (Greenleaf) has a rocking head and a propeller connected by a rotatable shaft. Movement of waves in a body of water in which the decoy is placed causes the head to rock, and thus the shaft and propeller rotate, imparting motion to the decoy. U.S. Pat. No. 3,000,128 (Mcada) shows a decoy having a battery powered propelling mechanism. U.S. Pat. No. 3,115,721 (Story) shows a feeder duck decoy having feet which are moved by the force of the waves of the water.

U.S. Pat. No. 3,689,927 (Boston) teaches the use of a radio receiver, positioned within a waterfowl decoy, to receive signals from a remote radio transmitter. The remote control can be used to operate an underwater propeller and rudder for directing the course of the decoy. U.S. Pat. No. 4,566,214 (McCrory, et al.) discloses a battery operated feeder duck decoy. A motor, weights, and coupling are utilized to impart rotational motion to the decoy. This motion causes the water about the decoy to ripple. U.S. Pat. No. 5,377,439 (Roos, et al.) discloses a remotely controlled decoy having a rudder that is responsive to electrical control signals. By controlling the rudder, an operator is able to provide directed locomotion for the buoyant body of the decoy.

While numerous attempt have been made to provide a decoy that simulates a live wildfowl, the need continues to exist for a decoy which simulates normal wildfowl activity in a lifelike manner. Particularly, many prior art attempts to develop lifelike decoys have been crude, and thus unsuccessful, or complex, and thus costly to implement. Accordingly, the need exists for a simple and inexpensive decoy for attracting wildfowl, such as ducks. The need also exists for a decoy which can be controlled and adjusted as desired by the operator to simulate live wildfowl. The present invention overcomes the drawbacks of past approaches, while meeting the stated and other needs.

SUMMARY OF THE INVENTION

It is an object of the present invention to provide an improved feeder decoy for attracting wildfowl, such as ducks.

It is an additional object of the present invention to attract wildfowl with a decoy constructed to splash the water in which the decoy is placed.

These and other objects are achieved by a decoy which simulates a wildfowl, such as a duck, in the feeder position. The decoy has a body formed of upper and lower body portions. The lower body portion is hollow and defines an internal cavity. Similarly, the upper body portion is hollow and defines its own internal cavity. The upper portion has a lower lip for engaging an annular rim located at the top of the upper body portion. The lower body portion has an open top which is covered by a cap. The upper body portion of the decoy completely covers the cap. A counterweight is positioned on the cap, and is releaseably secured to the cap at a selected location.

A keel is located beneath the body of the decoy. The keel has a weighted portion proximate the lower end. The non-weighted portion of the keel contains a horizontal slot for receiving a sliding weight. The sliding weight is releasably securable at a selected location along the slot. The lowermost portion of the keel includes a rudder having an aperture therethrough, and a threaded fitting. An anchor line may be secured through the aperture in the rudder for anchoring the decoy in a body of water. The threaded fitting is adapted to connect to a stake for staking the decoy into the bottom of a lake, or other body of water. Particularly, the threaded fitting on the keel inserts into a first open end of an internally threaded sleeve. A second open end of the internally threaded sleeve receives the threaded outer end of the stake. The opposite end of the stake is thrust into the earthen bottom of a body of water, to anchor the decoy.

The internal cavity formed by the lower body portion of the decoy houses electronic circuitry of the present invention. Particularly, the decoy has a motor, a motor controller, and a power source. The output of the motor connects to an axle, the outer ends of which extend through opposite side walls of the lower body portion of the decoy. Each outer end of the axle has a rubber paddle fixedly secured thereon. Operation of the motor causes the axle to rotate, thus causing the rubber paddles to rotate. In a preferred embodiment of the present invention, the motor controller includes timing circuitry for intermittently energizing the motor. The motor controller includes a first selector for permitting an operator to select a duration of rotation of the paddle members, and a second selector permitting the operator to select a duration that the paddle members remain idle.

In use, the decoy is placed in a body of water to attract wildfowl. The decoy is buoyant, and thus floats on the water, such that the keel and a lower portion of the lower body portion of the decoy are submerged in the water. The upper body portion, which includes a tail section, is above the surface of the water. Preferably, the axle is located just above the surface of the water, such that the rubber paddle members are located at the surface of the water. In this regard, the flat paddle members, when positioned vertically, have a first portion thereof beneath the surface of the water, and a second portion thereof above the surface of the water. Thus, rotation of the paddle members causes the water to splash, thus simulating a live wildfowl in feeder position.

In accordance with an aspect of the invention, the location at which the sliding weight is positioned in the slot on the keel effects the pitch of the decoy in the water, relative to a vertical axis. The axle is preferably positioned at a non-center location of the decoy, and is thus closer to one side of the decoy than an opposite side. The keel is preferably located in a plane transverse or perpendicular to the plane of the axle. As the sliding weight is positioned away from the side of the decoy having the axle, the resulting pitch of the decoy causes the paddle members to raise slightly and thus engage the water less than when the sliding weight is at the opposite end of the slot (on the same side of the decoy as the axle), in which case the paddle members are more greatly submerged in the water.

In accordance with an additional aspect of the present invention, the position at which the counterweight on the cap is located effects motion of the decoy when the paddle members are rotating. In this regard, placement of the releasably securable counterweight, at a non-central location of the decoy, and particularly near an edge of the cap, causes the decoy to roll, or rotate about a vertical axis, when the paddle members are rotating. This action further simulates the activity of a live wildfowl in a feeding position.

BRIEF DESCRIPTION OF THE DRAWINGS

The objects and features of the invention noted above are explained in more detail with reference to the drawings, in which like reference numerals denote like elements, and in which:

FIG. 3 is a top plan view taken along line 3—3 of FIG. 2 of the decoy of the present invention.

DETAILED DESCRIPTION OF THE INVENTION

Figure 1:
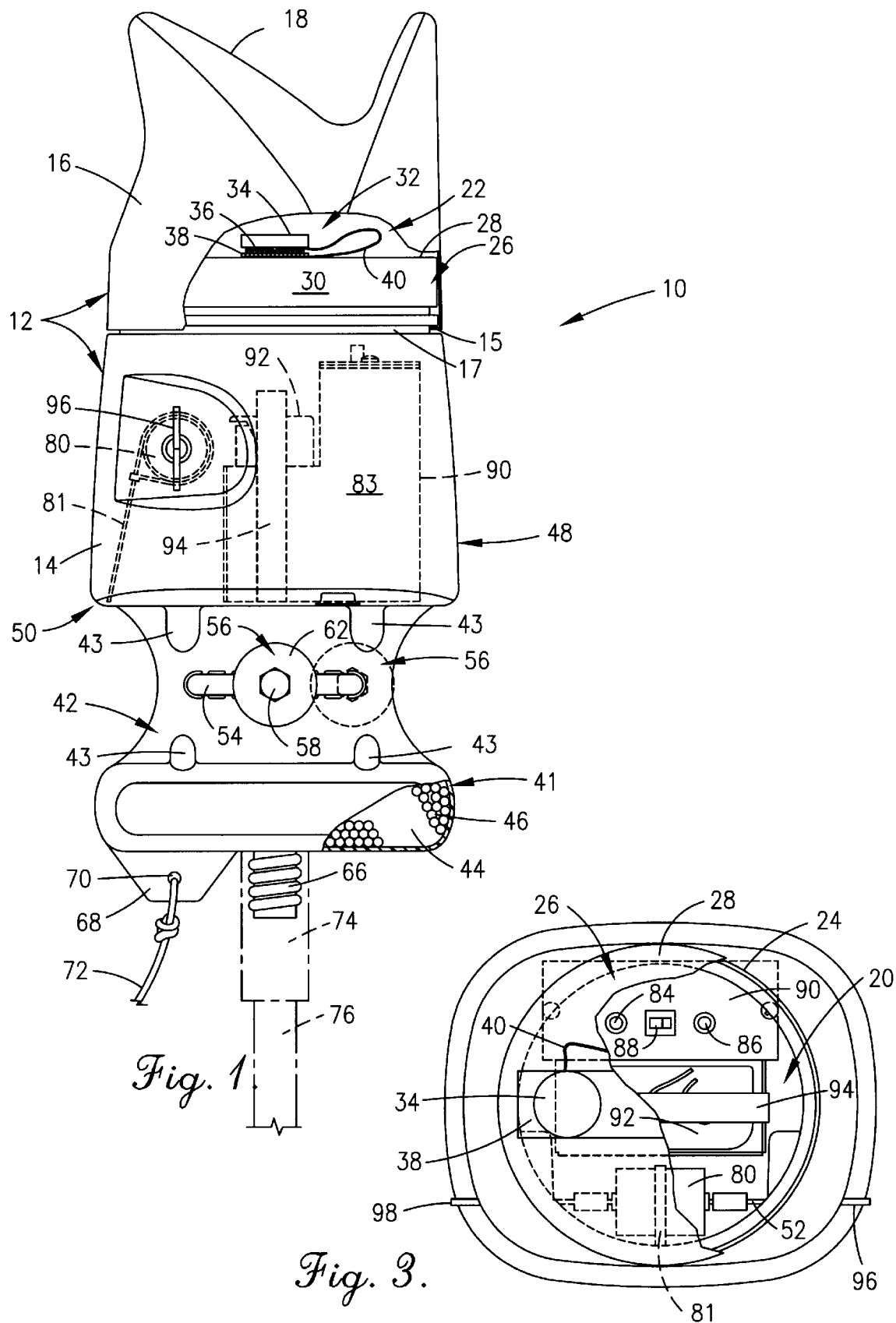
FIG. 1 is a side elevational view of the wildfowl decoy of the present invention.
Figure 2:
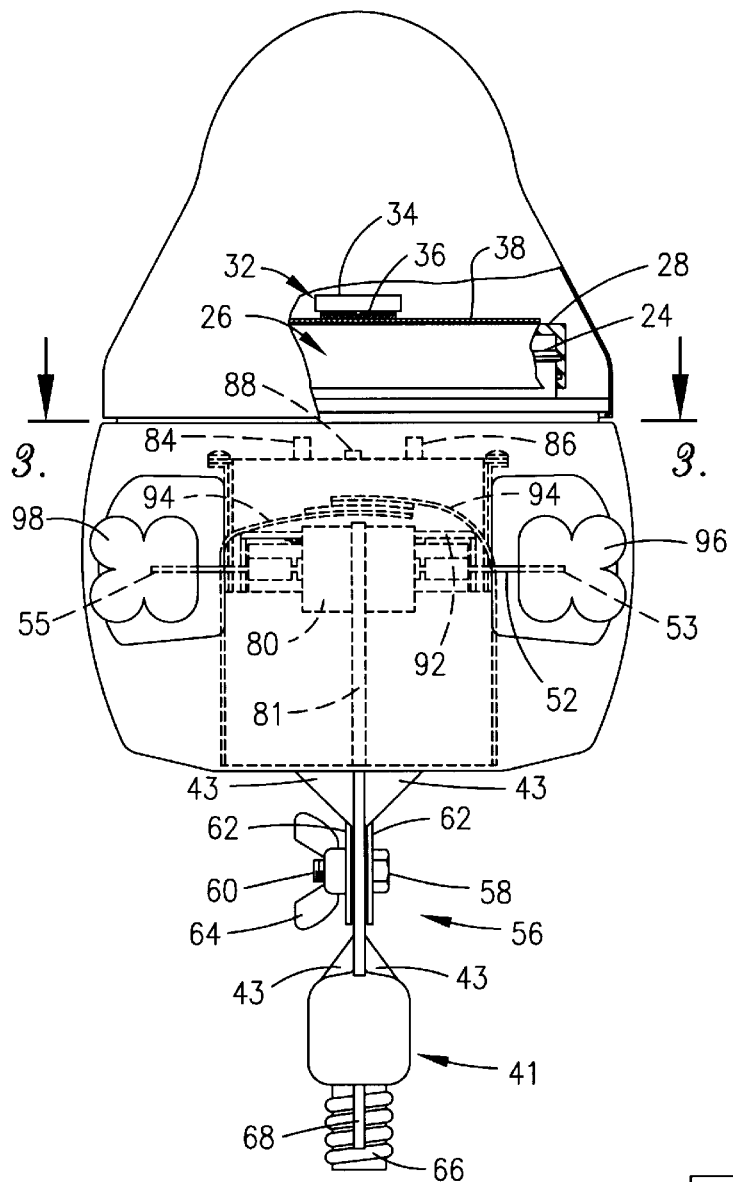
FIG. 2 is a rear elevational view of the decoy of the present invention.

With reference initially to FIGS. 1–3, a decoy of the present invention, simulating a wildfowl in a feeder position, is designated generally by reference numeral 10. Decoy 10 has a body 12 formed of a lower body portion 14, and an upper body portion 16. Upper body portion 16 forms a tail section 18, as illustrated. Body 12 of decoy 10 is formed of molded plastic. Lower body portion 14 is hollow, and defines an interior cavity 20 (FIG. 3). Upper body portion 16 is also hollow, and defines an interior cavity 22. Lower body portion 14 has an open upper top, leading to cavity 20, defined by annular rim 24. A cap 26 has a top 28 and a downwardly depending skirt 30. The skirt 30 engages with rim 24, as illustrated, to releasably secure cap 26 to bottom portion 14 of decoy 10. Cap 26 completely covers the opening leading to cavity 20, thus enclosing cavity 20. A lower end of upper body portion 14 has an inwardly turned lip 15 for mating with an exterior annular groove 17 in lower body portion 14 of decoy 10.

A counterweight, designated generally by reference numeral 32, is located on top 28 of cap 26. Counterweight 32 has a weight element 34 releasably secured to cap 26 by a fastener, such as a hook and loop fastener. Particularly, in a preferred embodiment, a fibrous pad 36 is positioned on a bottom surface of the weight element 34. A strip of hooks, designated generally by reference numeral 38, is located on the cap, and has a plurality of small hooks for engaging with the fibers of the fibrous pad 36. It will be readily understood that the described securing mechanism is a hook and loop fastener, such as marketed under the trademark Velcro®. A line 40, attached to the cap 26 and counterweight 32, is provided for retaining the counterweight in association with the cap 26, even when the weight element 34 is not fastened to the cap 26. As will be described in detail below, positioning of counterweight 32 affects the balance of the decoy 10, and thus its roll, or rotation about a vertical axis, when decoy 10 is in use.

Decoy 10 further has a keel designated generally by reference numeral 42. Keel 42, also formed of plastic, has a lower weight element 41, including a cavity 44 for housing weights, such as shot 46. As illustrated, keel 42 extends approximately from a front side 48 to a rear side 50 of decoy 10, and is aligned perpendicularly relative to an axle 52, described in detail below. Keel 42 has ribs 43 for structural stability.

Keel 42 has a slot 54 therethrough. Slot 54 receives a sliding weight 56. Sliding weight 56 is formed of a hex headed bolt 58, the threaded portion 60 of which extends through the slot 54, a pair of washers 62, and a wing nut 64 for securing the bolt 58 to the keel 42. When wing nut 64 is loosened, the sliding weight 56 may be positioned along the slot 54 in a desired location, and wing nut 64 can then be tightened to releasably secure the sliding weight 56 at the desired location. As described in detail below, the selected position of sliding weight 56 affects the pitch, with respect to a vertical axis, of decoy 10 when in use.

Keel 42 includes a threaded fitting 66 extending from a lower portion of keel 42. Lower portion of keel 42 also includes a rudder 68 having an aperture 70 therethrough. For anchoring purposes, an anchor line 72 may be inserted through aperture 70 of rudder 68. Threaded fitting 66 serves as a connector for connecting a stake, for anchoring purposes, to decoy 10. In this regard, in a preferred embodiment, decoy 10 includes an internally threaded sleeve 74, having open first and second outer ends. As illustrated in FIG. 1, a first outer open end of sleeve 74 is threaded onto threaded fitting 66. The second open outer end of internally threaded sleeve 74 receives the threaded stake 76.

Figure 4:
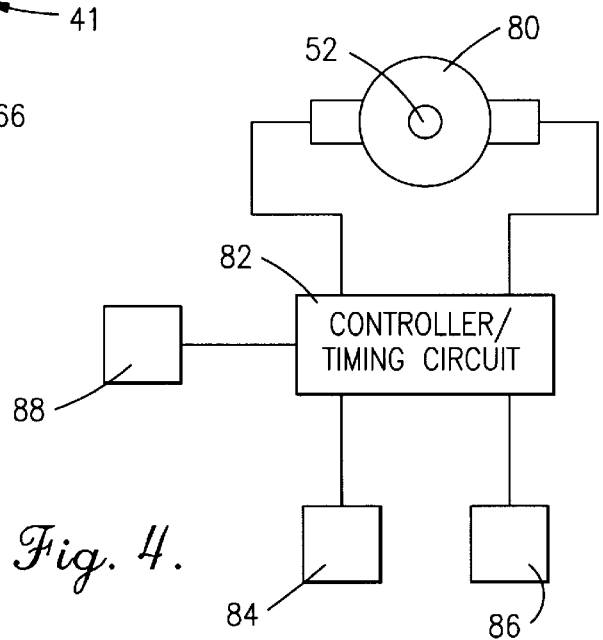
FIG. 4 is a block circuit diagram of the electrical circuitry associated with the present invention

With additional reference to FIG. 4, present invention has electrical circuitry, located in cavity 20 of lower body portion 14 of decoy 10, including a motor 80, a motor controller 82 connected to motor 80, and a power source, such as a battery pack, designated generally by reference numeral 83, for providing electrical power to motor 80 and motor controller 82. Motor controller 82 has a first input selector 84, and a second input selector 86, for selecting, respectively, a duration of energization for energizing motor 80 and a duration that motor 80 is to be idle, as described in detail below.

Motor controller 82 also includes an on/off switch 88. Motor controller 82 is housed within a housing 90, located within cavity 20 of lower body portion 14 of decoy 10. Power source 83 is positioned beneath protective cover 92, and held in place by a strap 94. Motor 80 has a rotary output, and is connected to an axle 52, as illustrated. Motor 80 is held securely in place by tie-down strap 81. Axle 52 has first and second outer ends, 53, 55 respectively. As illustrated, first and second outer ends 53, 55 of axle 52 extend through lower body portion 14 of decoy 10, such that first and second outer ends 52, 53 of axle 52 are located exteriorly of the internal cavity 20 defined by lower body portion 14 of decoy 10. Decoy 10 has first and second paddle members 96, 98, located on first and second outer ends 53, 55 of axle 52, respectively. Paddle members 96, 98 are preferably formed of flexible rubber.

In use, decoy 10 is located in a body of water, such as a lake, for the purpose of attracting wildfowl. Decoy 10 is buoyant, such that it floats on the surface of the water. Particularly, construction of decoy 10 is such that, when located in the water, all of keel 42 and a lowermost portion of lower body portion 14 of decoy 10 are submerged in the water. All of upper body portion 16 is above the surface of the water, such that tail section 18 appears as the tail of a live wildfowl in feeding position. A weighted anchor line 72 may be employed to anchor the decoy. Alternatively, decoy 10 may be anchored with a stake 76, by connecting stake 76 to threaded fitting 66 as previously described, and forcing stake 76 into the mud or earthen bottom of the water in which decoy 10 is deployed.

Prior to deployment of the decoy, the operator can set the decoy to operate in a desired fashion. In this regard, by removing upper body portion 16 and cap 26 from lower body portion 14, input controls 84 and 86, and power switch 88, are revealed through the opening leading to cavity 20 of lower body portion 14. When on/off switch 88 is turned on, thus providing power to the electric circuitry of the present invention, the operator may control input selector 84 and 86 to set controller to provide intermittent energization to motor 80. Particularly, utilizing input selector 84, the operator can select, within a range, the duration that motor 80 will be energized by motor controller and timing circuit 82. Utilizing input selector 86, the operator can select within a range the duration that the motor 80, and thus the paddle members 96, 98, will be idle. In this way, paddle members 96, 98 rotate periodically for a selected duration, wherein each period of rotation is separated by an intervening idle duration of a selected time. In a preferred embodiment, motor controller 82 is constructed so that the idle duration may be selected within the range of 30 seconds and 5 minutes, and the energization duration, for causing the paddle members 96, 98 to splash the water, may be set within the range of 5 seconds and 30 seconds. It will be understood and appreciated by those with skill in the art that the range of time provided for the idle and energization duration may be other than those specified in the preferred embodiment hereof, and is accomplished through selection of resistors and capacitors in the timing circuitry. Once input selectors 84 and 86 have been set as desired, cap 26 is positioned in place over the opening in the top of lower body section 14. Releasably securable counterweight 32 is placed in any desired location along strip 38, and upper body portion 16 of decoy 10 is positioned into place on lower body portion 14 of decoy 10.

In accordance with an aspect of the invention, when decoy 10 is placed in a body of water, axle 52 is preferably located just above the surface of the water. In this location, the paddle members 96, 98 provide optimum splashing of the water to lure wildfowl. Particularly, in order to adjust the pitch of decoy 10 when deployed, and particularly, adjust the location of axle 52 relative to the surface of the water, sliding weight 56 in keel 42 may be adjusted, as previously described.

In operation, paddle members 96, 98 rotate when motor 80 is energized, thus causing the water to splash, and thereby simulating a live duck in feeder position. Paddle members 96, 98 rotate for the selected energization duration, and then remain idle for the selected idle duration. Following the idle duration, paddle members 96, 98 again rotate for the selected splash duration. When decoy 10 is allowed to free float, or is anchored by anchor line 72, but is not staked into the mud, decoy 10 will have a pitch with respect to vertical based upon the location of sliding weight 56 in keel 42. Additionally, when counterweight 32 is located at a non-central location on cap 26, the decoy 10 is slightly off-balance, and will roll or rotate, with respect to the vertical axis, based upon the location of counterweight 32 on cap 26.

Decoy 10 of the present invention provides a highly useful decoy for luring wildfowl, such as duck. Its ability to splash water, and also pitch and roll, very accurately simulates a live wildfowl.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A wildfowl decoy for positioning at the surface of a body of water, said body of water having an earthen bottom, said wildfowl decoy comprising:

a body;

a keel positioned beneath said body, said keel having a slot therein; and a sliding weight received within said slot, wherein said sliding weight is releasably secured at a selected location along said slot at least a portion of said weight located exterior said keel.

2. A wildfowl decoy for positioning at the surface of a body of water, said wildfowl decoy comprising:

a body having an interior cavity and a tail portion, said tail portion positioned above said surface of said body of water;

a motor, having an output, said motor positioned within said interior cavity of said body;

an axle connected to said output of said motor, said axle having a longitudinal axis generally parallel to the surface of the body of water and having first and second outer ends located outside said interior cavity of said body;

a first paddle member located at said first outer end of said axle;

a second paddle member located at said second outer end of said axle, wherein said motor rotates said axle about its own axis, thereby causing said paddles to rotate and wherein said first and second paddle members are positioned at said surface of said body of water such that rotation thereof causes the water to splash, thereby emulating paddling feet of a live wildfowl; and a motor controller, connected to said motor and positioned within said interior cavity of said body, for controlling said motor to intermittently rotate said axle, thereby causing said paddle members to rotate intermittently, said motor controller having a first selector for selecting a duration of rotation of said paddle members and a second selector for selecting a duration of an idle period following each duration of rotation.

3. A wildfowl decoy for positioning at the surface of a body of water, said body of water having an earthen bottom, said wildfowl decoy comprising:

a body; and a keel positioned beneath said body, said keel having a threaded male member extending therefrom for threaded attachment to a stake.

4. The wildfowl decoy as set forth in claim 3, further comprising:

an adaptor comprising an internally threaded sleeve, having first and second open outer ends, wherein said first open outer end of said sleeve receives said threaded member on said keel and said second open outer end of said sleeve receives a threaded end of said stake.

5. A wildfowl decoy for positioning at the surface of a body of water, said body of water having an earthen bottom, said wildfowl decoy comprising:

a body comprises an upper body portion and a lower body portion, said upper body portion having a width dimension substantially equal a width dimension of said lower body portion and said lower body portion having an opening at a top thereof, said wildfowl decoy further comprising:

a cap removably covering said opening at said top of said lower body portion, and wherein said upper body portion completely covers said cap.

6. The wildfowl decoy as set forth in claim 5 further comprising:

a counterweight releasably located at a selected position on said cap.

7. The wildfowl decoy as set forth in claim 6, said counterweight comprising:

a weight element;

a hook and loop fastener comprising a strip positioned on said cap and a pad positioned on said weight element.

8. A wildfowl decoy for positioning at the surface of a body of water, said wildfowl decoy comprising:

a body having an interior cavity and a longitudinal axis, said longitudinal axis being generally perpendicular said surface of said body of water, said body simulating a tail of a wildfowl;

a motor, having an output, said motor positioned within said interior cavity of said body;

an axle connected to said output of said motor, said axle having a longitudinal axis generally parallel to the surface of the body of water and having first and second outer ends located outside said interior cavity of said body;

a first paddle member located at said first outer end of said axle; and a second paddle member located at said second outer end of said axle, wherein said motor rotates said axle about its own axis, thereby causing said paddles to rotate.

9. The wildfowl decoy as set forth in claim 1 wherein said body comprises an upper body portion and a lower body portion, said lower body portion having an opening at a top thereof, said wildfowl decoy further comprising:

a cap removably covering said opening at said top of said lower body portion, and wherein said upper body portion completely covers said cap.

10. The wildfowl decoy as set forth in claim 9 further comprising:

a counterweight releasably located at a selected position on said cap.

11. The wildfowl decoy as set forth in claim 10, said counterweight comprising:

a weight element;

a hook and loop fastener comprising a strip positioned on said cap and a pad positioned on said weight element.

12. The wildfowl decoy as set forth in claim 11 wherein, when said motor is running and said counterweight is positioned off of a center location relative to said cap, said decoy rotates with respect to a vertical axis.

13. The wildfowl decoy as set forth in claim 8 further comprising:

a keel located beneath said body, said keel having a slot therein; and a sliding weight received within said slot, wherein said sliding weight is releasably secured at a selected location along said slot.

14. The wildfowl decoy as set forth in claim 13, said keel having a fitting for attachment to a stake.

15. The wildfowl decoy as set forth in claim 14, said fitting comprising a threaded male member, said wildfowl decoy further comprising:

an adaptor comprising an internally threaded sleeve, having first and second open outer ends, wherein said first open outer end of said sleeve receives said threaded fitting on said keel and said second open outer end of said sleeve receives a threaded end of said stake.

16. The wildfowl decoy as set forth in claim 13 wherein said selected location of said sliding weight dictates a pitch of said decoy relative to vertical.

17. The wildfowl decoy as set forth in claim 8, wherein said body has a tail portion positioned above said surface of said body of water, and wherein said first and second paddle members are positioned at said surface of said body of water such that rotation thereof causes the water to splash, thereby emulating paddling feet of a live wildfowl.

18. The wildfowl decoy as set forth in claim 17 further comprising:

a motor controller, connected to said motor and positioned within said interior cavity of said body, for controlling said motor to intermittently rotate said axle, thereby causing said paddle members to rotate intermittently.

19. The wildfowl decoy as set forth in claim 18, said motor controller further comprising:

a first selector for selecting a duration of rotation of said paddle members; and a second selector for selecting a duration of an idle period following each duration of rotation.

* * * * *